UNITED STATES PATENT OFFICE.

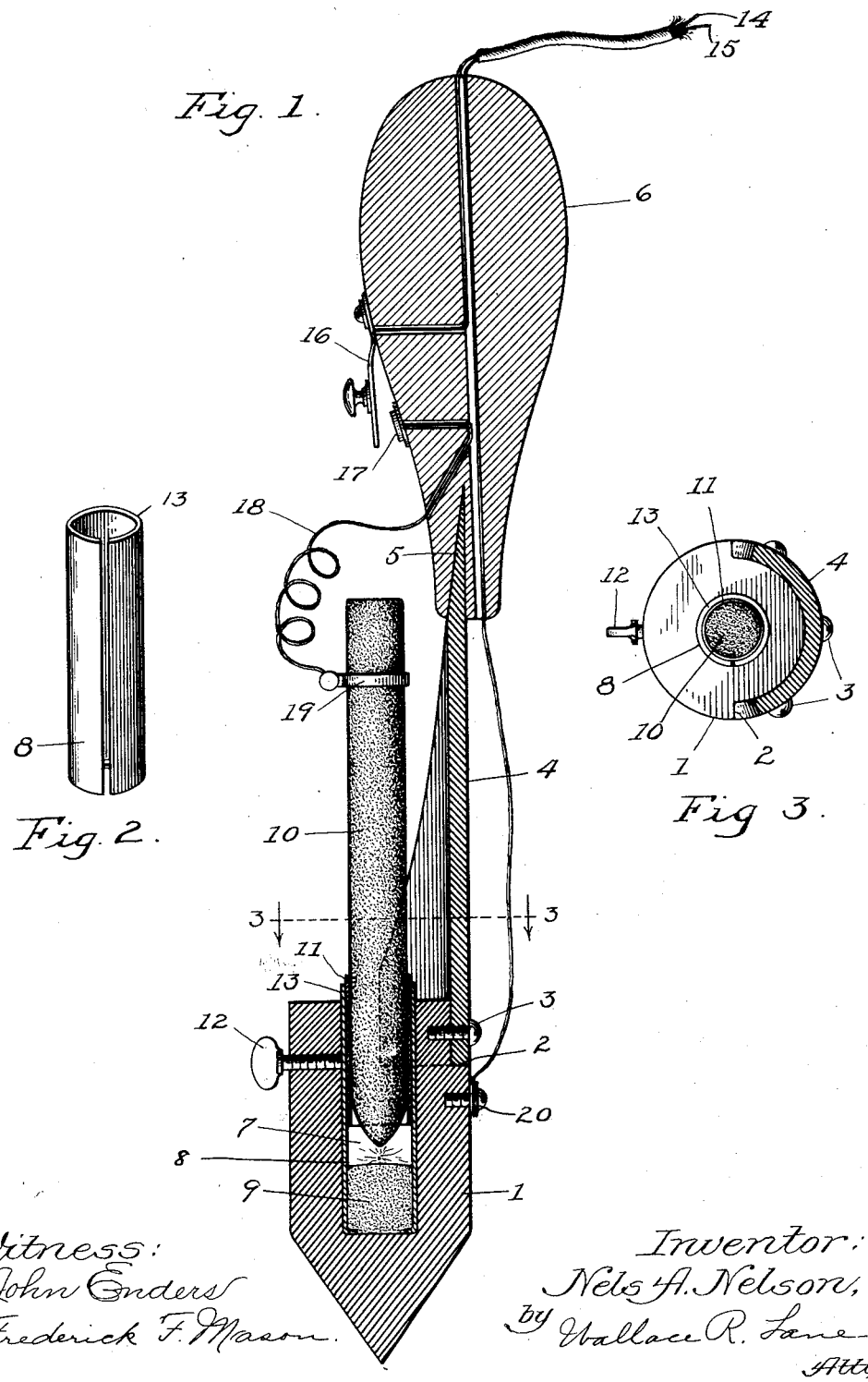

NELS A. NELSON, OF BODE, IOWA, ASSIGNOR TO BACO ELECTRIC CO., OF BODE, IOWA, A CORPORATION OF IOWA.

ELECTRIC-HEATING IRON.

1,357,648.   Specification of Letters Patent.   Patented Nov. 2, 1920.

Application filed September 9, 1918. Serial No. 253,125.

*To all whom it may concern:*

Be it known that I, NELS A. NELSON, a citizen of the United States, residing at Bode, in the county of Humboldt and State of Iowa, have invented certain new and useful Improvements in Electric-Heating Irons, of which the following is a specification.

This invention relates to heating irons, and more particularly to a device of this type which is heated by electricity.

Among the objects of my invention is to make possible the heating of such irons as soldering irons, flat irons, branding irons, or the like, in a quicker, safer, and more convenient manner than heretofore known; further the provision of means whereby such irons may be heated with an electric arc; further to eliminate the necessity of liquid fuel such as gasolene or the like in this class of work, and thereby secure a lower insurance rate on the buildings in which the same is performed; further to provide a novel arrangement of arc-producing carbons in a heating iron head and means for adjusting the length of the arc; further to insulate the movable carbon from the head in an effective manner; further to provide a cartridge for the reception of both carbons in such manner that one of the carbons will be held fixed and the other be capable of adjustment to vary the length of the arc; further to make the cartridge removable and expansible whereby the fixed carbon may be renewed, and insulation readily applied around the adjustable carbon; further to provide a more simple, economical and efficacious device of the class described; and such further objects, advantages and capabilities as will later more fully appear.

My invention further resides in the combination, construction and arrangement of parts illustrated in the accompanying drawing, and while I have shown therein a preferred embodiment of my invention, I desire it to be understood that the same is susceptible of modification and change without departing from the spirit of my invention.

Referring to the drawings:

Figure 1 is a longitudinal section taken through the central plane of a soldering iron embodying my invention.

Fig. 2 is a perspective detail view of the sleeve or cartridge used therein.

Fig. 3 is a section on the line —3— of Fig. 1.

In the drawings, it will be seen that the soldering iron in which I have illustrated my invention as being embodied, comprises the head 1, having suitably secured thereto by means of the recess 2, and screws 3, the shank 4, upon the tang of which is mounted a suitable handle 6. The head 1 may be of any suitable shape, such as cylindrical, hexagonal, or the like, and is formed of metal or other suitable material capable of being heated to a high degree without fusing or melting.

Within the head 1 is formed the cavity or bore 7, within which cavity is removably fitted the sleeve or cartridge 8, which as seen in Fig. 2 is slitted throughout its length whereby to render the same expansible for a purpose to be hereinafter set forth. Mounted in the lower end of the cartridge or sleeve 8 is the short length of carbon 9, while longitudinally adjustable within the sleeve 8 is the carbon 10, which pieces of carbon form the positive and negative poles whereby a suitable electric arc may be maintained therebetween when a suitable current of electricity is passed therethrough. As will be noted, the metallic sleeve 8 is in close contact with the metal of the head 1, and the carbon 9 is in close contact with the metal of the sleeve 8 thereby permitting the flow of electricity through these parts.

Surrounding the carbon 10 and fitting within the sleeve 8 is the insulation 11, the function of which is to prevent the flow of electricity from the carbon 10 directly into the head 1. The sleeve 8 when fitted within the cavity 7 is secured in place by means of the set screw 12, which as noted may be loosened to permit the removal of the sleeve 8. The removal of the sleeve 8, together with the lower carbon 9, may be effected by grasping the upper edge 13 of the sleeve with a pair of pliers or the like and pulling on the same.

The handle 6 is provided with suitable apertures therein to accommodate the passage of the wires 14 and 15, which may be connected with any suitable source of electricity, and have interposed in the circuit any suitable and desirable resistance. Mounted upon the side of the handle 6 is the switch 16, which is of a resilient nature, whereby to cause the switch to normally stand open, and permit the same when pressed upon by the thumb of the operator to be moved toward the handle and complete the circuit by making contact with the plate 17, to which is connected in an obvious manner the wire 18, which in turn is connected by means of the metal band or clasp 19 to the carbon 10. In order to complete the circuit, the other one of the two wires is extended downwardly through the central opening in the handle 6 and grounded into the head 1 by means of the screw 20, or other suitable means.

In the operation of my device, the handle 6 is grasped in the hand of the operator, and the switch 16 closed by the thumb, which will, when connected with a suitable source of electricity, cause an electric arc to be set up between the points of the carbons 9 and 10, which due to its intense heat will quickly heat the head 1 of the soldering iron. The carbon 10 may be easily and quickly adjusted longitudinally by merely unscrewing the set screw 12 and moving the carbon to the desired new position, and then tightening the screw 12 to hold the carbon in such adjusted position. One of the main functions of the sleeve or cartridge 8, in addition to providing ready removal of the carbon 9, is to permit the easy insertion in the cavity 7 of the insulation 11, by virtue of the fact that when the sleeve 8 is out of the cavity 7, its diameter may be easily enlarged, thus permitting the ready insertion of the insulation between the sleeve and the carbon 10, after which the sleeve and its carbons may be quickly inserted within the cavity 7 and the space between the carbon points readily adjusted to give the length of arc desired.

While I wish it to be understood that any form of switch may be used upon the handle 6, I prefer the form illustrated for the reason that when the device is laid down and the operator's hand removed therefrom, the switch will automatically open, thus breaking the electrical circuit and eliminating all danger of the head 1 becoming overheated by too long continuance of the electric arc. Also by merely removing the thumb or finger from the insulated finger piece on the switch, the current may be broken at any time desired.

It is to be noted that the lower end of the cartridge 8 is crimped or flanged inwardly to engage in an annular depression in the bottom end of the lower carbon 9, whereby removal of the cartridge will simultaneously remove the lower carbon. Also as will be readily understood in the art, the two carbons must be touched together when using an alternating current to start the flow of current and generate heat and then gradually drawn apart for formation of the arc; while in using a direct current, the same will jump the gap between the two carbons and start the arc without the necessity of actual previous contact.

While I have illustrated my invention as applied to a soldering iron, I wish it to be understood that it is capable of application to other implements, such as branding irons, flat irons, or the like, a portion of which is to be maintained in a heated condition.

Having now described my invention, I claim:—

1. In a heating apparatus, a head having a cavity therein, a sleeve adjustably mounted in said cavity, means for securing the sleeve in any adjusted position and a pair of poles in said sleeve adapted to produce an electric arc when a suitable current is passed therethrough.

2. In a heating apparatus, a head having a cavity therein, an expansible sleeve removably fitted in said cavity, a pole fixed in said sleeve, a second pole longitudinally adjustable in said sleeve, insulation between said second pole and said sleeve, and means for passing an electric current through said poles whereby to heat said head.

3. In a heating iron, a head having a cavity therein, an expansible sleeve removably fitted in said cavity, a carbon fixed in one end of said sleeve, a second carbon mounted in said sleeve for longitudinal adjustment therein, insulating means between said second carbon and said sleeve, releasable means for securing said sleeve and its contained carbons in said cavity, said last mentioned means also permitting adjustment of said second carbon, a handle on said head, conductors passing through said handle and connected to conduct current to the respective carbons, and a switch on said handle to control the passage of electric current through said carbons to create an arc therebetween and heat said head or to stop the same.

4. In a device of the class described, a head having a cavity therein, an expansible sleeve removably fitted in said cavity and firmly holding an electric pole in one end thereof, and means whereby a second pole may be longitudinally adjusted in the other end of said sleeve to vary the length of arc between said poles when an electric current is passed therethrough, said means comprising an element for compressing the expansible sleeve to hold the second named pole in adjusted position.

5. In a device of the class described, a head having a cavity therein, a conducting sleeve in said cavity in electrical contact with said head, a fixed pole in one end of said sleeve and in electrical contact therewith, a longitudinally adjustable pole in said sleeve, and insulating means between said adjustable pole and said sleeve.

6. In a device of the class described, a head having a cavity therein, a carbon fixed in said cavity in electrical contact with said head, a second carbon mounted for longitudinal adjustment in said cavity, means for holding said second carbon against movement, but permitting it to be adjusted longitudinally in said cavity when desired, means for electrically insulating said second carbon from said head, a shank secured to said head and confined to substantially one side thereof, a handle on said shank, a longitudinal opening through said handle, electric wires extending through said opening and connected to conduct current to said head and said adjustable carbon respectively, and a switch on said handle in position for easy operation by the operator's thumb whereby the current can be caused to flow or stopped as desired.

7. In a device of the class described, a head having a cavity therein, a carbon fixed in said cavity in electrical contact with said head, a second carbon mounted for longitudinal adjustment in said cavity, means permitting adjustment of said second carbon in said cavity, means for electrically insulating said second carbon from said head, a shank secured to said head, a handle on said shank, a longitudinal opening through said handle, electric wires extending through said opening and connected to conduct current to said head and said carbon respectively, and a switch on said handle in position for operation by the operator's thumb, whereby the current can be caused to flow or be stopped as desired.

In witness whereof, I hereunto subscribe my name to this specification.

NELS A. NELSON.